March 1, 1966 J. L. FORREST 3,237,230
APPARATUS FOR REMOVING MARGINAL STRIPS
OF COATING FROM A PRECOATED WEB
Original Filed Feb. 7, 1962 2 Sheets-Sheet 1

INVENTOR
JOHN L. FORREST

BY
ATTORNEYS

March 1, 1966   J. L. FORREST   3,237,230
APPARATUS FOR REMOVING MARGINAL STRIPS
OF COATING FROM A PRECOATED WEB
Original Filed Feb. 7, 1962   2 Sheets-Sheet 2

INVENTOR
JOHN L. FORREST

BY
ATTORNEYS

United States Patent Office 3,237,230
Patented Mar. 1, 1966

3,237,230
APPARATUS FOR REMOVING MARGINAL STRIPS OF COATING FROM A PRECOATED WEB
John L. Forrest, Windsor, N.Y., assignor to General Aniline & Film Corporation, New York, N.Y., a corporation of Delaware
Original application Feb. 7, 1962, Ser. No. 171,708. Divided and this application Feb. 8, 1965, Ser. No. 431,060
2 Claims. (Cl. 15—100)

This is a division of application Serial No. 171,708 filed February 7, 1962.

This invention relates to improvements in apparatus for removing strips of coating from a precoated web, especially for removing marginal strips of back coating of a film web in order to prepare it for subsequent striping with a magnetizable coating.

In the art of motion pictures, technological advancements have made it feasible to provide sound recording by means of a magnetizable stripe placed on the motion picture film. In this way, amateur movie makers and others may record the sound at the same time the picture is being taken, or may "dub in" suitable sound later, thus utilizing the flexibility of magnetic recording to provide sound movies.

Commonly, motion picture films have a back coating known as an antihalation layer placed on the opposite side of the support from that of the sensitized layer. The back coating, generally referred to as CBC, is necessary to control the halation caused by reflection from the film web, and also to provide light protection to the light-sensitive layer in the roll, so that it can be loaded into the exposing equipment in light. This coating generally consists of carbon black, or a dye, incorporated in a suitable gelatin or resin binder or vehicle and is removed in the film processing solution. Since the back coating is removed in processing, it is therefore necessary to first remove the back coating precisely only from the area on which the magnetic stripe will be coated in order that the magnetic stripe can be coated directly on the web.

In order that the magnetic sound stripe on the film should not interfere with the pictures taken or projected, it must be placed at the edge of the film outside of conventional sprocket holes. The removal of a small area of CBC coating from the film in order to provide a clearance for the magnetic stripe in the place of the removed coating is difficult and has presented problems in the art. The dimensions of the film are rather small, thus increasing the difficulty of removing a narrow strip of coating without disturbing the CBC layer on the remainder of the film.

It is the primary object of this invention to provide a novel apparatus for precisely removing a predetermined strip of the back coating on the edge of motion picture film for subsequent coating with a stripe of magnetizable material.

A particular feature of this invention is that use is made of moving belts dampened with a solvent for the CBC coating and the back of the moving film web is contacted with the belts moving in the opposite direction. Means are also provided for guiding the belts and film reltaive to one another so that the belts contact the film at a precisely predetermined area to accurately remove marginal strips of the back coating, other means being provided for preventing the film contacted by the belts, from buckling.

Other objects and features will be apparent from the following description of the invention, pointed out in particularity in the appended claims and taken in connection with the accompanying drawings in which:

Figure 1:
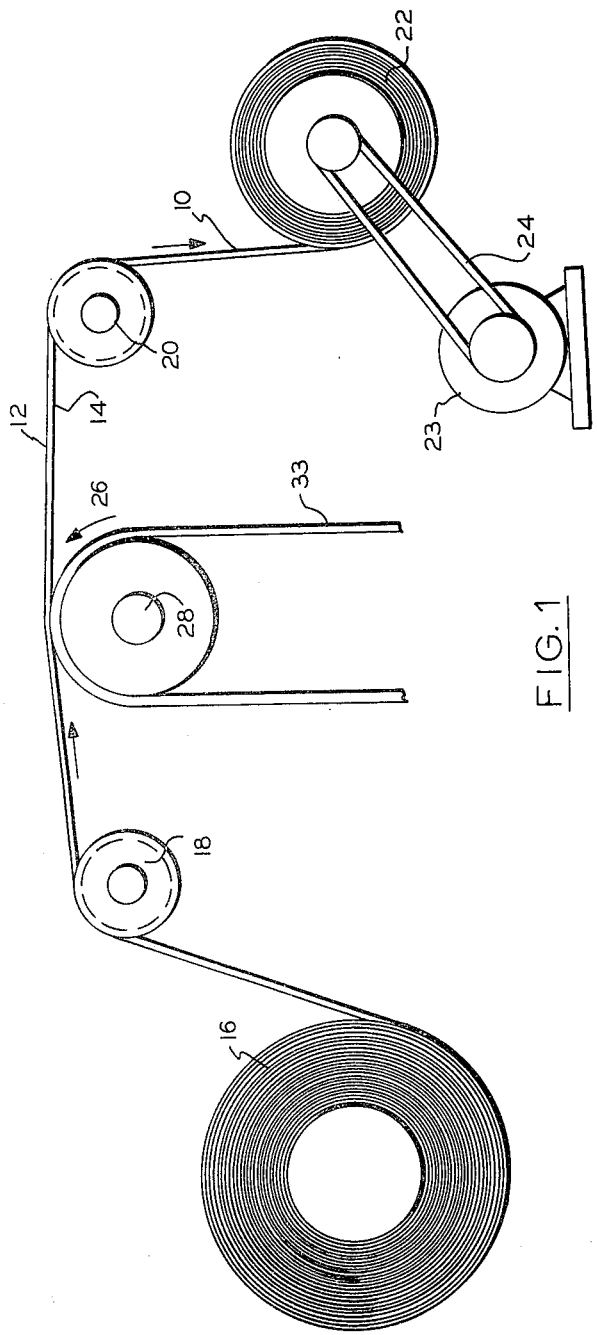
FIG. 1 is a schematic side elevational view of the apparatus showing the passage of the film and two solution absorbent endless belts for back coating removal in a preferred embodiment of this invention.

Referring now to the drawings, in FIG. 1, there is shown a film web 10 having front surface 12 carrying a light-sensitive emulsion coating and a back surface 14 with the CBC, or antihalo, coating thereon. The film is supplied from a roll 16 and passes over guide rollers 18 and 20 to be wound up on a wind-up roll 22 driven by a belt 24 from a suitable motor 23. The means for removing a longitudinal edge portion of the back coating 14 on the film 10 with which this invention is particularly concerned is illustrated at 26.

Figure 2:
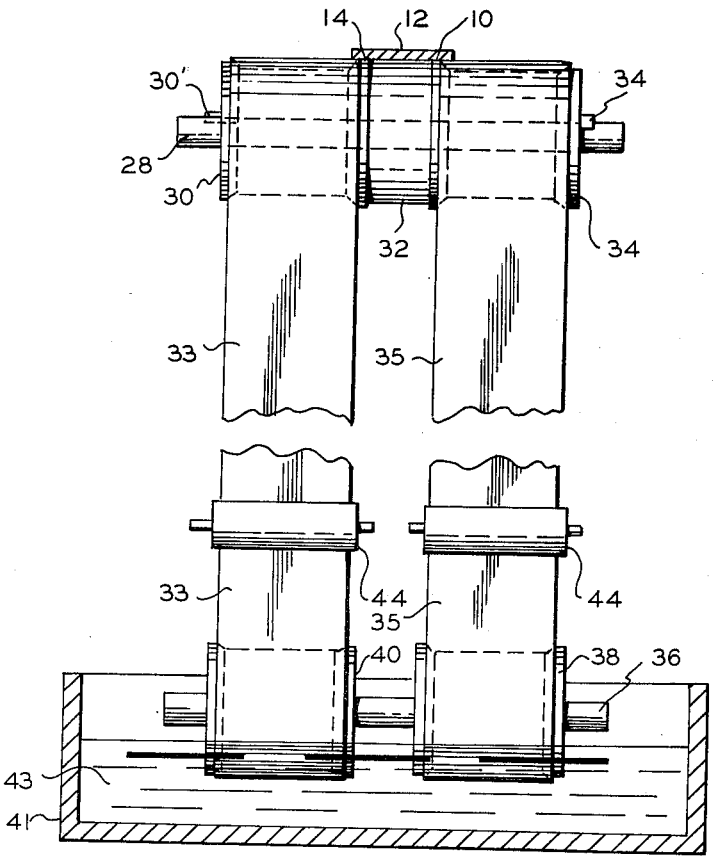
FIG. 2 is a schematic front elevation of the apparatus of FIG. 1 with the film shown in section, illustrating the endless belts and the means for dampening the belts.

Referring now to FIG. 2, between the guide rollers 18 and 20 (FIG. 1), there is provided a rotatable shaft 28 having rollers 30, 32 and 34 thereon. Rollers 30 and 34 are keyed to the shaft at 30' and 34', respectively, while roller 32 is free to rotate on the shaft 28 and is axially spaced so that it does not rub against rollers 30 and 34. The rollers 30 and 34 carry the endless belts 33 and 35, respectively, and are so dimensioned in diameter that the belts 33 and 35 will contact the bottom surface 14 of the film 10 slightly above the surface of roller 32. Thus, the belts will contact the edges of the back coating 14 on film 10 and the film will be prevented from buckling by the idler roller 32; however, the latter does not normally contact the back surface 14 of the film 10. The belts 33 and 35 are chosen from a fabric which is porous and absorbent; such as plush fabric, commonly made into plush belts. The fabric of the belts 33 and 35 is chosen so that it will be absorptive and capable of removing the coating 14 at the point of contact.

The belts serve several useful purposes viz.; they moisten and wipe away the back coating, carrying it into the tray of solvent where the coating particles so carried are deposited. At the same time, the belts are moistened with the solvent and return in their cycle to again moisten and wipe away the back coating from the narrow guided area along the edge of the film to allow guiding and control and provide space for removal of excess solvent from the belts. The lower ends of the endless belts are kept taut and within their recesses in rollers 30 and 34 by means of weighted flanged rollers 38 and 40 mounted on a weighted shaft 36. The purpose of weighting rollers 38 and 40 in shaft 36 is to provide the requisite tension in the belts 33 and 35, although this could also be done by springs, separate weights, or the like.

Figure 3:
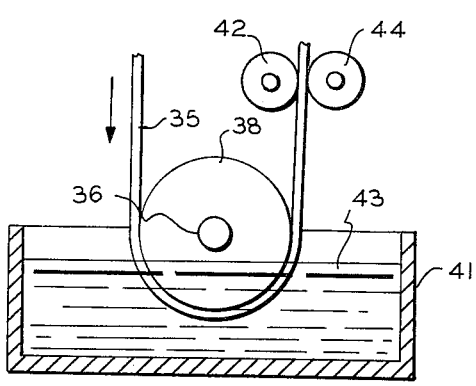
FIG. 3 is a segmental side elevational view of a portion of the apparatus of FIG. 2, showing the passage of a belt through the dampening means.

As shown in FIG. 3, a pair of squeegee or wringer rollers 42 and 44 are provided as the belt moves upwardly. A tank 41 contains a solvent solution 43, in which the rollers 38 and 40 are immersed, of the type adapted to remove the back coating from the film. It is important that the solution used be a solvent for the resin or binder used in the back coating or CBC.

The operation of the apparatus shown in FIGURES 1 to 3 will now be described. The film web 10 having the back coating 14 to be removed is accurately guided by guide rollers 18 and 20 which hold the film in its proper place and insure accurate guiding over the moving belts 33 and 35. The belts 33 and 35 are driven in a direction opposite to the movement of the film 10 by means of rollers 30 and 34. The belts 33 and 35 contact the back surface coating 14 of the film 10 near the edges thereof in a precisely predetermined position, the film being prevented from buckling by the idler roller 32. The belts having passed through the solution 43 in tank 41, are dampened and carry a sufficient amount of the solvent to soften, dissolve, and neatly remove the back coating.

Thus, the coating 14 will be removed in a longitudinal stripe at the point where the belts 33 and 35 contact the coating 14 on film 10. The belts then pass back into the solution 43 and are washed therein to remove the sludge of dissolved coating. The wet, solution-laden belts then pass through wringer rollers 42 and 44, where excess solvent is squeezed from the belts to insure a moist, but not soaking wet, condition prior to again coming into contact with the film.

It is also contemplated, to assist in belt cleaning, that a jet of the solution can be directed against the belt under pressure and it also would be within the scope of the invention to provide a moving brush to clean the belt. For long and continuous use, it would be desirable to provide purifying equipment to insure clean solution 43 at all times for the belts. This could be a small distillation type of purifier similar in principle to that used in dry-cleaning establishments.

What is claimed is:

1. Apparatus for removing narrow strips of coating from the marginal edges of a coated web of photographic film which comprises, in combination:
    (a) means for accurately guiding the web laterally and for advancing the web longitudinally;
    (b) a pair of endless belts comprising absorbent material;
    (c) means for dampening said belts with a solvent for the coating on the web;
    (d) means for driving and guiding said endless belts in spaced relationship to one another, into frictional contact with said web in a manner to cause relative movement between the belts and the web;
    (e) said guide means including a pair of spaced rollers positioned for guiding the belts with the inside edges thereof in contact with the marginal edges of the coated web, and an idler roller of slightly reduced diameter between said spaced rollers;
    (f) said web extending from a position overlying the inside edge of one of said roller supported belts to a position overlying the inside edge of the other belt, so as to normally avoid contact with said idler roller;
    (g) said idler roller being adapted to prevent said web from buckling in the space between said spaced rollers.

2. Apparatus according to claim 1 wherein the means for dampening said belts with a solvent for the coating or the web, includes a tank through which said belts pass, and further comprising means for creating and maintaining a predetermined tension in the moving absorbent endless belts, and wringer means for controlling the amount of solvent carried by said belts from said tank to the marginal points of contact with the web.

References Cited by the Examiner

UNITED STATES PATENTS

| | | | |
|---|---|---|---|
| 506,184 | 10/1893 | McDonald | 118—225 X |
| 783,569 | 2/1905 | Edlich | 134—15 X |
| 1,206,924 | 12/1916 | Scherf | 15—100 X |
| 1,487,375 | 3/1924 | Fuchs | 15—100 X |
| 1,540,417 | 6/1925 | Owens | 118—72 |
| 1,669,394 | 5/1928 | Ellis et al. | 134—9 |
| 1,926,363 | 9/1933 | Bergstein | 118—75 X |
| 2,142,538 | 1/1939 | Tondreau | 15—100 |
| 2,305,011 | 12/1942 | Kienninger | 15—100 |
| 2,628,924 | 2/1953 | Johnston et al. | 134—15 |
| 2,633,428 | 3/1953 | Klug | 134—15 X |
| 2,927,553 | 3/1960 | Del Valle | 117—44 X |
| 3,050,758 | 8/1962 | Wilkins | 15—100 |

MORRIS O. WOLK, *Primary Examiner.*